(12) United States Patent
Dale

(10) Patent No.: US 9,097,350 B2
(45) Date of Patent: Aug. 4, 2015

(54) AXIAL NON-CONTACT SEAL

(75) Inventor: Timothy Dale, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 734 days.

(21) Appl. No.: 13/437,058

(22) Filed: Apr. 2, 2012

(65) Prior Publication Data

US 2013/0259660 A1 Oct. 3, 2013

(51) Int. Cl.
*F01D 11/02* (2006.01)
*F16J 15/44* (2006.01)
*F04D 29/08* (2006.01)

(52) U.S. Cl.
CPC ............... *F16J 15/445* (2013.01); *F01D 11/02* (2013.01); *F04D 29/083* (2013.01); *F05D 2260/38* (2013.01)

(58) Field of Classification Search
CPC ............ F05D 2240/55; F05D 2240/56; F05D 2240/57; F01D 11/02; F01D 11/025; F01D 11/04; F01D 11/06; F16J 15/16; F16J 15/164; F16J 15/441; F16J 15/442
USPC .......... 415/170.1, 171.1, 173.7, 174.2, 174.3, 415/174.5, 231; 277/409, 411, 412, 416, 277/418
See application file for complete search history.

(56) References Cited

U.S. PATENT DOCUMENTS

| | | | | |
|---|---|---|---|---|
| 4,426,087 A | * | 1/1984 | Sargent et al. | 277/422 |
| 4,595,207 A | * | 6/1986 | Popp | 277/303 |
| 5,029,875 A | * | 7/1991 | Spain et al. | 277/307 |
| 5,971,400 A | * | 10/1999 | Turnquist et al. | 277/416 |
| 6,502,823 B1 | * | 1/2003 | Turnquist et al. | 277/355 |
| 6,786,487 B2 | * | 9/2004 | Dinc et al. | 277/355 |
| 7,182,345 B2 | | 2/2007 | Justak | |
| 7,410,173 B2 | | 8/2008 | Justak | |
| 7,641,200 B2 | * | 1/2010 | Chevrette | 277/303 |
| 7,909,335 B2 | * | 3/2011 | Turnquist et al. | 277/355 |
| 8,002,285 B2 | | 8/2011 | Justak | |
| 2002/0000694 A1 | * | 1/2002 | Justak | 277/355 |
| 2003/0185669 A1 | | 10/2003 | Brauer et al. | |
| 2008/0018054 A1 | | 1/2008 | Herron et al. | |
| 2008/0169616 A1 | * | 7/2008 | Awtar et al. | 277/593 |
| 2008/0246223 A1 | | 10/2008 | Justak | |
| 2008/0265513 A1 | * | 10/2008 | Justak | 277/301 |
| 2009/0033037 A1 | | 2/2009 | Varanasi et al. | |
| 2011/0056208 A1 | * | 3/2011 | Norris et al. | 60/772 |

(Continued)

OTHER PUBLICATIONS

Gunston, Bill, ed., Jane's Aero-Engines, Mar. 2000, DPA, Issue 7, pp. 510-512.*
International Preliminary Report on Patentabilty for PCT Application No. PCT/US2013/034522, mailed Oct. 16, 2014.

(Continued)

*Primary Examiner* — Dwayne J White
*Assistant Examiner* — Joshua R Beebe
(74) *Attorney, Agent, or Firm* — Carlson, Gaskey & Olds, PC

(57) ABSTRACT

A gas turbine engine has a turbine section and an air moving section upstream of the turbine section. A seal is between a static surface and a rotating surface in at least one of the turbine section and air moving section. The seal includes a seal shoe which is biased at least in part by a spring force, with the spring force created by cuts formed to provide a gap to allow arms associated with the seal to provide the spring force. The movement of the shoe is along a direction having at least a component parallel to an axis of rotation of the gas turbine engine. In addition, an axially moving non-contact seal is claimed.

20 Claims, 4 Drawing Sheets

(56) References Cited

U.S. PATENT DOCUMENTS

2011/0121519 A1* 5/2011 Justak .......................... 277/412
2012/0073263 A1 3/2012 Kohlenberg et al.

OTHER PUBLICATIONS

International Search Report and Written Opinion for International Application No. PCT/US2013/034522 completed on Feb. 6, 2014.

* cited by examiner

AXIAL NON-CONTACT SEAL

BACKGROUND OF THE INVENTION

This application relates to an axially moving non-contact seal which is particularly useful in a gas turbine engine.

Gas turbine engines are known, and typically include a fan delivering air into a compressor, and also outwardly of the compressor as bypass air. The air is compressed in the compressor and delivered downstream into a combustion section where it is mixed with fuel and ignited. Products of this combustion pass downstream over turbine rotors, driving the turbine rotors to rotate. The turbine rotors in turn rotate the compressors and fan.

Recently, a gear reduction has been provided between a low pressure (or low spool) compressor and the fan such that a low pressure (or low spool) turbine can drive both of these components but at different speeds.

There are a number of surfaces within a gas turbine engine that would benefit from receiving a seal. One known type of seal is a non-contact seal. Such seals typically have sealed by moving in a radial direction. There are surfaces within the gas turbine engine that are not capable of being sealed by such radially moving non-contact seals.

While axially moving seals are known, they have typically not been of the most efficient type of seal.

SUMMARY OF THE INVENTION

In a featured embodiment, a gas turbine engine has a turbine section and an air moving section upstream of the turbine section. A seal is between a static surface and a rotating surface in at least one of the turbine and air moving sections. The seal includes a seal shoe which is biased at least in part by a spring force. The spring force is created by cuts formed to provide a gap to allow arms associated with the seal to provide the spring force, and the movement of the shoe along a direction having at least a component parallel to an axis of rotation of the gas turbine engine.

In a further embodiment according to the previous embodiment, the air moving section includes one of a fan and a compressor.

In a further embodiment according to the previous embodiment, the turbine section drives a fan through a gear reduction.

In a further embodiment according to the previous embodiment, a gear ratio of the gear reduction is greater than or equal to about 2.4.

In a further embodiment according to the previous embodiment, the movement of the seal is directly parallel to the axis of rotation.

In a further embodiment according to the previous embodiment, the movement of the seal also has a radial component. The seal seals on a generally conical shaped surface.

In a further embodiment according to the previous embodiment, high pressure air is delivered into a cavity within the seal to drive the shoe toward an opposed surface.

In a further embodiment according to the previous embodiment, a dynamic pressure between the seal and an opposed surface tends to bias the shoe away from the surface.

In a further embodiment according to the previous embodiment, the seal is attached to the static structure. The surface is a rotating surface that rotates with one of the air moving and turbine sections.

In a further embodiment according to the previous embodiment, the shoe and carrier are formed in segments by the gaps.

In a further embodiment according to the previous embodiment, the shoes extend circumferentially, and are curved about the axis of rotation.

In a further embodiment according to the previous embodiment, the shoes extend circumferentially, and are curved about the axis of rotation.

In a further embodiment according to the previous embodiment, the seal is mounted to the static structure, and seals relative to the rotating surface.

In another featured embodiment, a gas turbine engine has a turbine section, a fan and a compressor. A seal is between a static surface and a rotating surface in at least one of the turbine section, fan, and compressor. The includes a seal shoe which is biased forwardly and outwardly relative to a static structure at least in part by a spring force, with the spring force created by cuts formed to provide a gap to allow arms associated with the seal to provide the spring force. The movement of the shoe is along a direction having at least a component parallel to an axis of rotation of the gas turbine engine. The turbine section drives the fan through a gear reduction. High pressure air is delivered into a cavity within the seal to drive the shoe toward an opposed surface. A dynamic pressure is between the seals and the opposed surface tending to bias the shoe away from the surface. The shoe extends circumferentially, and is curved about the axis of rotation.

In a further embodiment according to the previous embodiment, the movement of the seal is directly parallel to the axis of rotation.

In a further embodiment according to the previous embodiment, the movement of the seal also has a radial component. The seal seals on a generally conical shaped surface.

In a further embodiment according to the previous embodiment, the seal is mounted to the static structure and seals relative to the rotating surface.

In a further embodiment according to the previous embodiment, a gear ratio of the gear reduction is greater than or equal to about 2.4.

In a further embodiment according to the previous embodiment, the fan delivers a portion of air into a bypass duct, and a portion of air as core air flow to the compressor, with a bypass ratio being greater than or equal to about 6.

In another featured embodiment, an axially moving non-contact seal has a seal body including a seal shoe biased axially forwardly and outwardly at least in part by a spring force. The spring force is created by cuts formed to provide a gap to allow arms associated with the seal to provide the spring force. High pressure air is delivered into a cavity within the seal to drive the shoe toward an opposed surface. A dynamic pressure between the seal and the opposed surface tends to bias the shoe away from the surface. The shoe extends circumferentially, and is curved about a central axis in a circumferential direction.

These and other features of the invention would be better understood from the following specifications and drawings, the following of which is a brief description.

DETAILED DESCRIPTION

Figure 1:
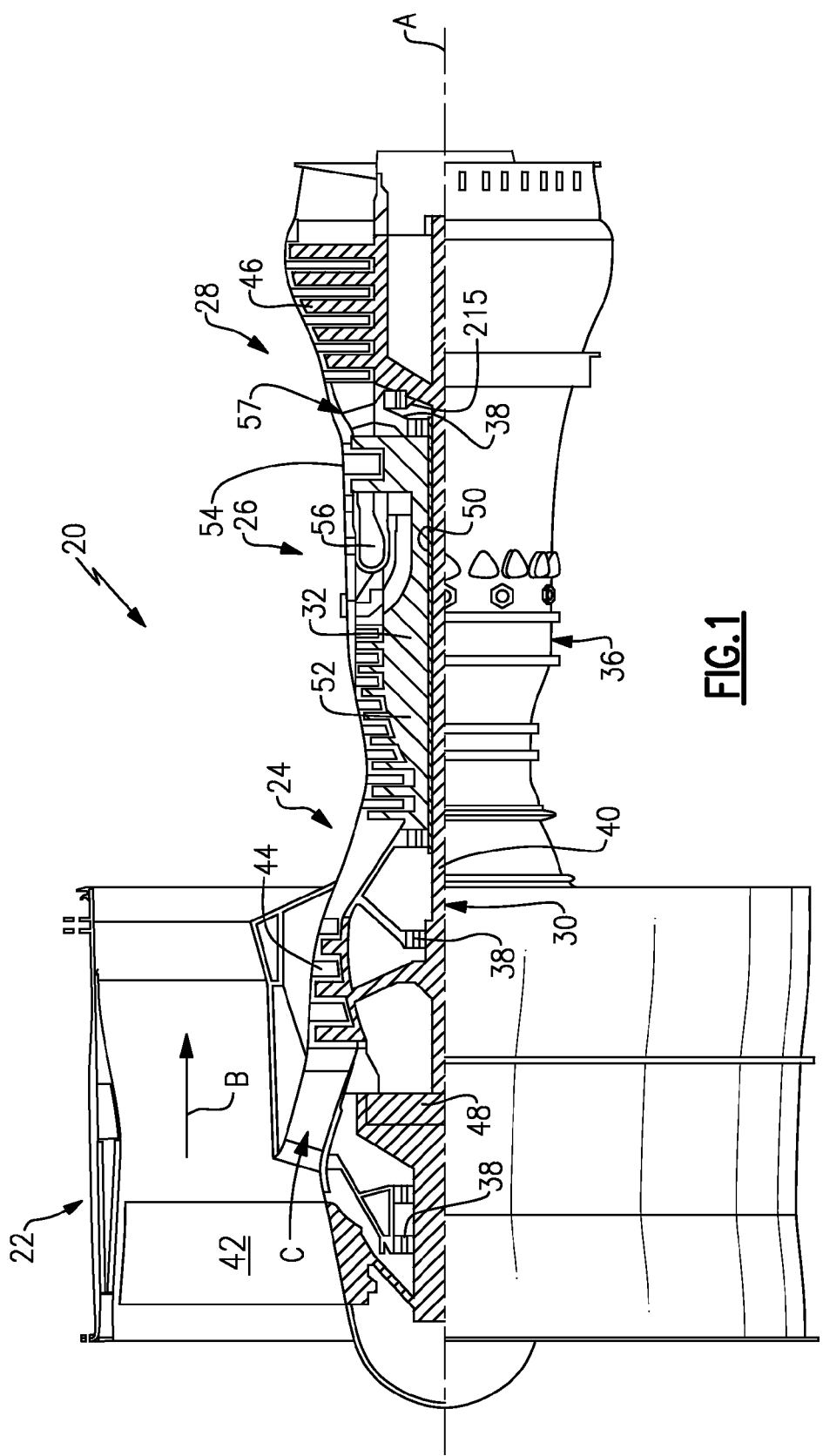
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 where fuel is added, mixed, and burned and then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The terms "high" and "low" as utilized with reference to speed or pressure are relative to each other. The compressor and turbine associated with the "high" spool 32 operates at higher pressure and speeds than does the compressor and turbine associated with the "low" spool. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. The shafts can be either co-rotating or counter-rotating.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is the total pressure measured prior to inlet of low pressure turbine 46 as related to the total pressure at the outlet of the low pressure turbine 46 prior to an exhaust nozzle 400. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans. Utilizing the geared architecture 48 enables a high speed low spool which tends to increase the efficiency of the low pressure compressor and the low pressure turbine. Further, it enables greater pressure ratio in fewer stages.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the total pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
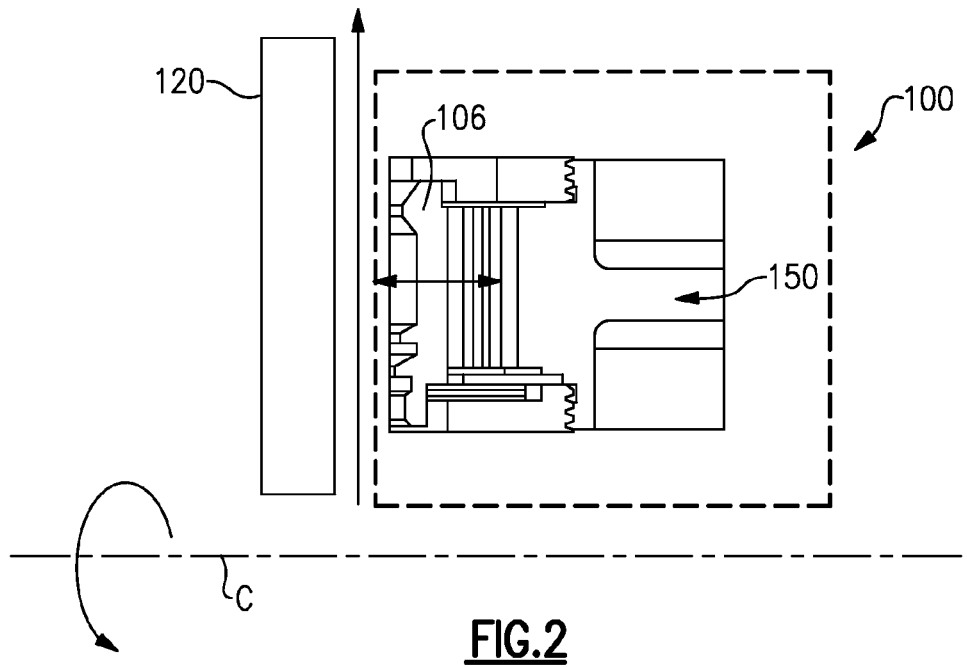
FIG. 2 schematically shows the location of one type of seal.

As shown in FIG. 2, a seal 100 may be mounted to a static structure 150 within the gas turbine engine as shown in FIG. 1. This seal will move along centerline C in an axial direction and will seal relative to a rotating surface 120. Rotating surface 120 is rotating about a centerline C. The operation of the seal will be described below.

Figure 3:
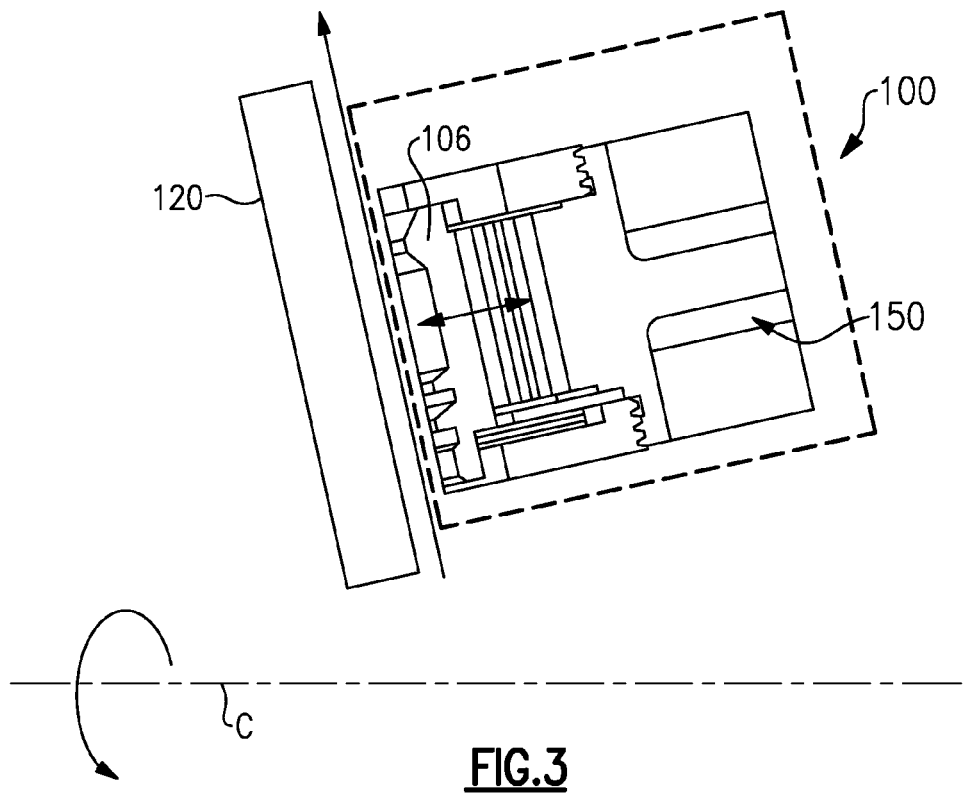
FIG. 3 shows another location.

As shown in FIG. 3 the rotating surface 120 may be conical, still, the seal shoe surface 106 will move with at least a component in an axial direction defined by the axis of rotation C.

A non-contact seal, which moves as shown, for example, in FIG. 2 or 3, may be associated with the turbine section, the compressor section, or the fan section as illustrated in FIG. 1. Notably, for purposes of this application, the fan and compressor sections will be generically known as "air moving sections."

Figure 4:
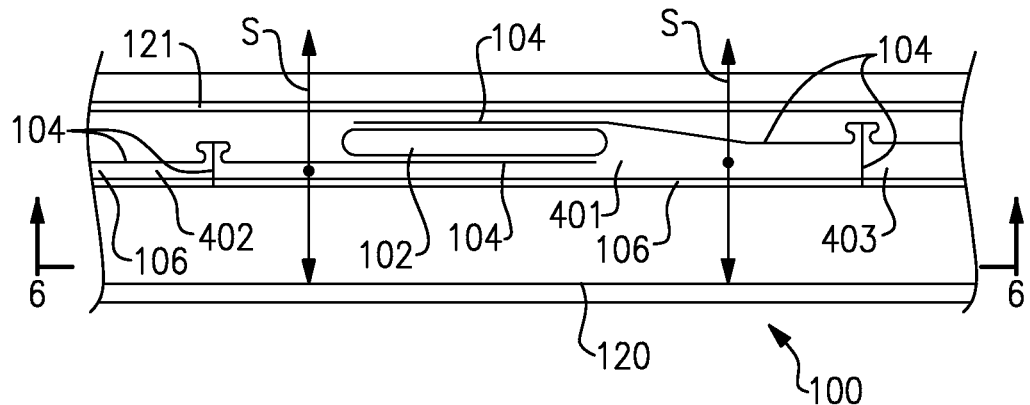
FIG. 4 shows a cross-sectional detail of the structure of a seal.

FIG. 4 shows one example of a non-contact seal. One type of seal may be a HALO™ seal available from ATGI, Advanced Technologies Group, Inc. of Stuart, Fla. The HALO™ seal 100 as shown has inner shoes 106, and an outer carrier 121. The outer carrier 121 and the shoes 106 are generally formed from a single piece of metal, and are cut as shown at 104 such that the combined seal 100 is formed into segments. As shown, the cuts 104 actually provide a gap that allow arms associated with the seal to provide a spring force, as mentioned below. The gaps provided by the cut 104 are relatively small, for example less than 0.050" (0.127 cm). The spring force S is shown schematically. As shown in FIG. 4, there are portions of three adjacent segments 401, 402, 403, which come together to form the overall seal 100. A cavity 102 receives pressurized air.

Figure 5:
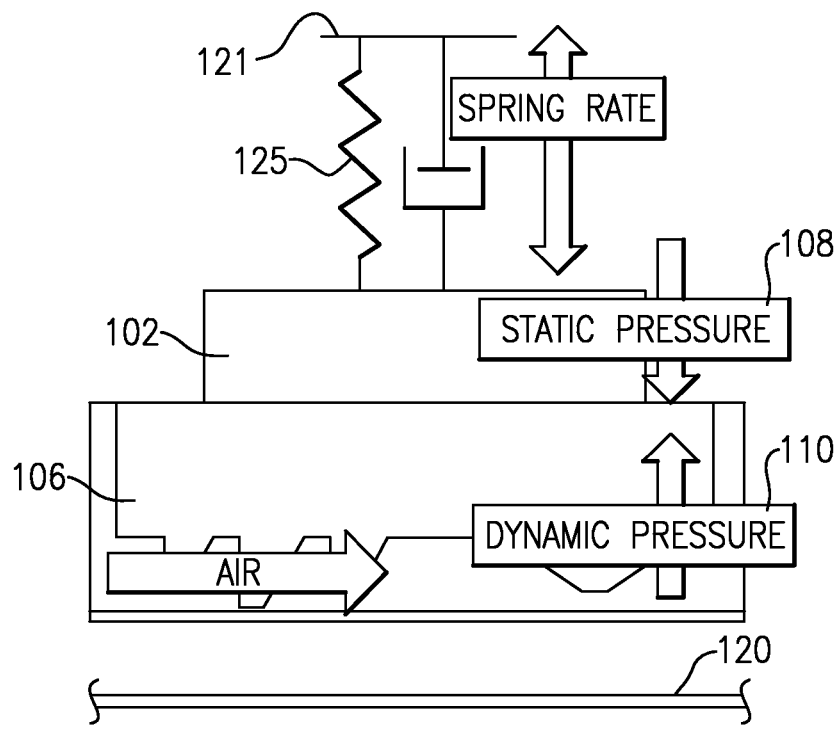
FIG. 5 is a force diagram of the FIG. 4 seal.

As shown in FIG. 5 a spring force, shown schematically at 125, biases the seal shoe 106 toward a neutral position. The spring force is created as the shoe 106 is otherwise biased toward and away from the rotor 120. That is, there is a natural position of the shoe 106 relative to the carrier 121, and, as it moves away from this position in either direction, it creates an opposing bias force.

As can be appreciated from FIG. 4, taken into combination with FIG. 5, air is injected into the cavity 102, and biases the shoe 106 toward the rotor 120. Thus, there is a static pressure force 108 forcing the shoe 106 toward the rotor, and an opposing spring force 125 tending to restore the shoe to a neutral position. In addition, a dynamic pressure 110, whose magnitude depends on the proximity of the shoe to the rotor, forces the shoe away from the rotor.

These three forces come into equilibrium to center the shoe at a desired location relative to the rotor 120 such that any disturbance to the system will tend to redistribute the forces in a manner that works to restore the shoe to the same material position as prior to the disturbance. In this way, the seal is self-adjusting, and without need of any external control. These types of self-adjusting non-contacting seals effectively minimize both axi-symmetric (all shoes of the ring behave in the same manner) and non-axisymmetric (each shoe of the ring behaves independent of its neighbors) clearances. As such, these seals achieve very low leakage rates which enable the provision of thrust balance cavities in an effective and efficient manner.

Figure 6:
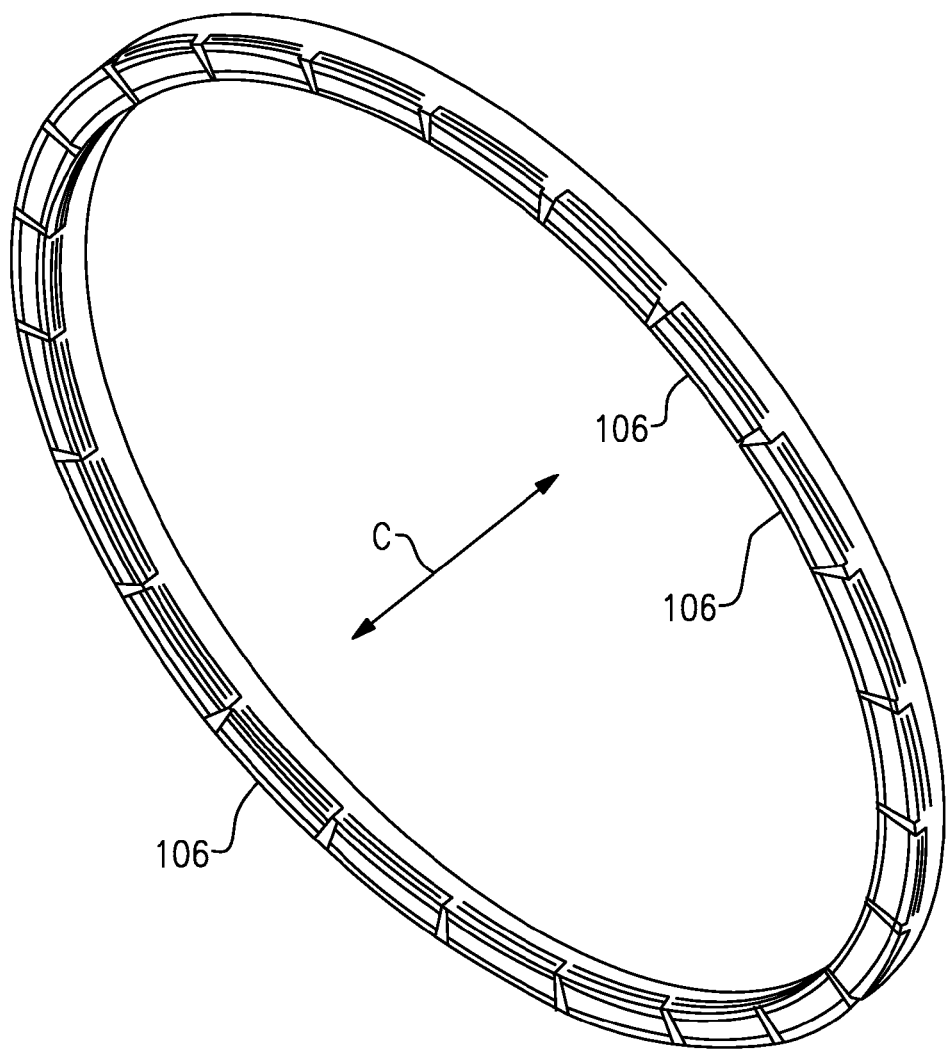
FIG. 6 shows a front surface of a seal.

Notably, as shown in FIG. 6, the shoes 106 curve as seal 100 extends circumferentially about a center line C.

While the seals are shown on the static housing 150, they may also rotate with rotor 120 and seal on static housing 150. While one particular seal is shown, other types of seals may be utilized. The HALO™ type seal has been proposed in gas turbine engines, but not as an axially moving seal member as disclosed above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a turbine section and an air moving section upstream of the turbine section; and
   a seal between a static surface and a rotating surface in at least one of said turbine section and said air moving section;
   said seal including a seal shoe which is biased at least in part by a spring force, with said spring force created by cuts formed to provide a gap to allow arms associated with said seal to provide said spring force, and the movement of said shoe being along a direction having at least a component parallel to an axis of rotation of the gas turbine engine; and
   wherein the movement of said shoe is one of directly parallel to said axis of rotation, or the movement of said shoe also having a radial component, and said seal sealing on a generally conical shaped surface.

2. The gas turbine engine as set forth in claim 1, wherein said air moving section includes one of a fan and a compressor.

3. The gas turbine engine as set forth in claim 1, wherein said turbine section drives a fan through a gear reduction.

4. The gas turbine engine as set forth in claim 3, wherein a gear ratio of said gear reduction is greater than or equal to about 2.4.

5. The gas turbine engine as set forth in claim 1, wherein said movement of said shoe is directly parallel to said axis of rotation.

6. The gas turbine engine as set forth in claim 1, wherein the movement of said show also having a radial component, and said seal sealing on a generally conical shaped surface.

7. The gas turbine engine as set forth in claim 1 wherein high pressure air is delivered into a cavity within said seal to drive said shoe toward an opposed surface.

8. The gas turbine engine as set forth in claim 7, wherein a dynamic pressure between the seal and an opposed surface tends to bias said shoe away from said surface.

9. The gas turbine engine as set forth in claim 8, wherein said seal is attached to said static structure, and said surface is a rotating surface that rotates with one of said air moving and turbine sections.

10. The gas turbine engine as set forth in claim 8, wherein said shoe and said carrier are formed in segments by said gaps.

11. The gas turbine engine as set forth in claim 10, wherein said shoes extend circumferentially, and are curved about said axis of rotation.

12. The gas turbine engine as set forth in claim 1, wherein said shoes extend circumferentially, and are curved about said axis of rotation.

13. The gas turbine engine as set forth in claim 1, wherein said seal is mounted to said static structure, and seals relative to said rotating surface.

14. A gas turbine engine comprising:
   a turbine section, a fan and a compressor;
   a seal between a static surface and a rotating surface in at least one of said turbine section, said fan and said compressor, said seal including a seal shoe which is biased forwardly and outwardly relative to a static structure at least in part by a spring force, with said spring force created by cuts formed to provide a gap to allow arms associated with said seal to provide said spring force, and the movement of said shoe being along a direction having at least a component parallel to an axis of rotation of the gas turbine engine;
   said turbine section drives said fan through a gear reduction;
   high pressure air is delivered into a cavity within said seal to drive said shoe toward an opposed surface, a dynamic pressure between the seals and the opposed surface tending to bias said shoe away from said surface;
   said shoe extends circumferentially, and is curved about said axis of rotation; and
   wherein the movement of said shoe is one of directly parallel to said axis of rotation, or the movement of said shoe also having a radial component, and said seal sealing on a generally conical shaped surface.

15. The gas turbine engine as set forth in claim 14, wherein said movement of said shoe is directly parallel to said axis of rotation.

16. The gas turbine engine as set forth in claim 14, wherein the movement of said shoe also having a radial component, and said seal sealing on a generally conical shaped surface.

17. The gas turbine engine as set forth in claim 14, wherein said seal is mounted to said static structure and seals relative to said rotating surface.

18. The gas turbine engine as set forth in claim 14, wherein a gear ratio of said gear reduction is greater than or equal to about 2.4.

19. The gas turbine engine as set forth in claim 14, wherein said fan delivering a portion of air into a bypass duct, and a portion of air as core air flow to said compressor, with a bypass ratio being greater than or equal to about 6.

20. An axially moving non-contact seal comprising:
a seal body including a seal shoe which is biased axially forwardly and outwardly at least in part by a spring force, with said spring force created by cuts formed to provide a gap to allow arms associated with said seal to provide said spring force;
high pressure air delivered into a cavity within said seal to drive said shoe toward an opposed surface;
a dynamic pressure between the seal and the opposed surface tends to bias said shoe away from the surface;
said shoe extending circumferentially, and being curved about a central axis in a circumferential direction; and
wherein the movement of said shoe is one of directly parallel to said axis of rotation, or the movement of said shoe also having a radial component, and said seal sealing on a generally conical shaped surface.

* * * * *